United States Patent
Frantz et al.

(10) Patent No.: US 12,007,970 B2
(45) Date of Patent: Jun. 11, 2024

(54) AUTOMATIC REWRITING OF SUBTOTAL CALCULATIONS

(71) Applicant: SIGMA COMPUTING, INC., San Francisco, CA (US)

(72) Inventors: Jason D. Frantz, San Francisco, CA (US); Robert C. Woollen, San Rafael, CA (US); Joseph M. Hain, Benicia, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 72 days.

(21) Appl. No.: 17/824,255

(22) Filed: May 25, 2022

(65) Prior Publication Data

US 2023/0409548 A1    Dec. 21, 2023

(51) Int. Cl.
*G06F 16/22* (2019.01)
*G06F 16/28* (2019.01)

(52) U.S. Cl.
CPC ........ *G06F 16/221* (2019.01); *G06F 16/2282* (2019.01); *G06F 16/283* (2019.01)

(58) Field of Classification Search
CPC .................................................... G06F 40/18
USPC .................................................... 707/722
See application file for complete search history.

(56) References Cited

U.S. PATENT DOCUMENTS

| | | | |
|---|---|---|---|
| 10,095,679 B2 * | 10/2018 | Gur | G06F 40/18 |
| 2007/0061344 A1 * | 3/2007 | Dickerman | G06F 16/283 |
| 2017/0315979 A1 * | 11/2017 | Boucher | G06F 16/2228 |

* cited by examiner

*Primary Examiner* — Hung T Vy

(57) ABSTRACT

Automatic rewriting of subtotal calculations including presenting, by a table manager, a spreadsheet structure on a GUI of a client computing system, wherein the spreadsheet structure presents a data set from a cloud-based data warehouse; receiving, at a first column of the spreadsheet structure by the table manager, a formula that includes a reference to a second column of the spreadsheet structure, wherein the formula is received from the client computing system; detecting, by the table manager, that the second column includes a subtotal calculation of a third column of the spreadsheet structure; and rewriting, by the table manager, the formula by replacing the reference to the second column with the subtotal calculation of the third column.

18 Claims, 5 Drawing Sheets

AUTOMATIC REWRITING OF SUBTOTAL CALCULATIONS

BACKGROUND

Field of the Invention

The field of the invention is data processing, or, more specifically, methods, apparatus, and products for automatic rewriting of subtotal calculations.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for automatic rewriting of subtotal calculations including presenting, by a table manager, a spreadsheet structure on a GUI of a client computing system, wherein the spreadsheet structure presents a data set from a cloud-based data warehouse; receiving, at a first column of the spreadsheet structure by the table manager, a formula that includes a reference to a second column of the spreadsheet structure, wherein the formula is received from the client computing system; detecting, by the table manager, that the second column includes a subtotal calculation of a third column of the spreadsheet structure; and rewriting, by the table manager, the formula by replacing the reference to the second column with the subtotal calculation of the third column.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
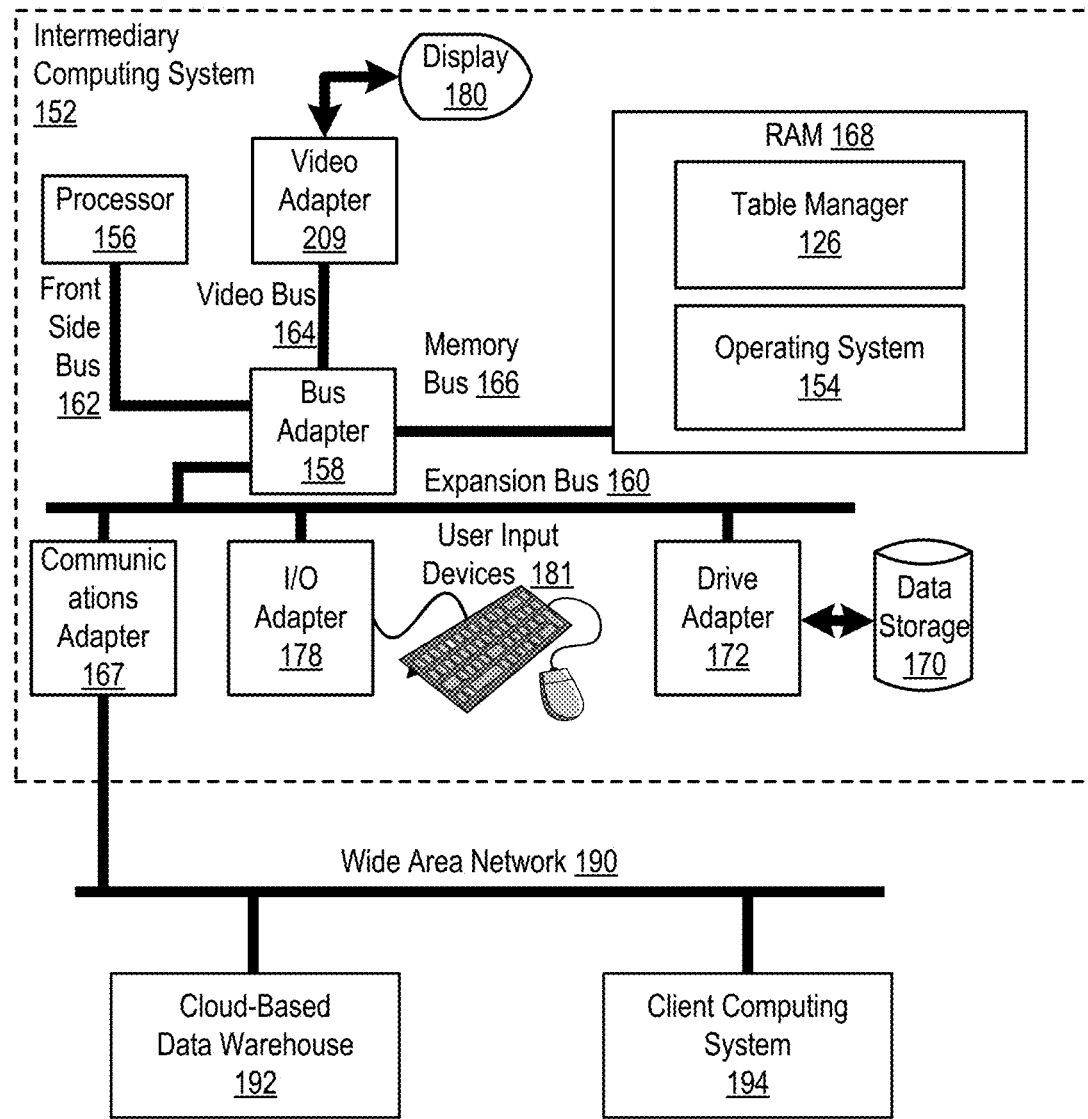
FIG. 1 sets forth a block diagram of an example system configured for automatic rewriting of subtotal calculations according to embodiments of the present invention.

Exemplary methods, apparatus, and products for automatic rewriting of subtotal calculations in accordance with the present invention are described with reference to the accompanying drawings, beginning with FIG. 1. FIG. 1 sets forth a block diagram of automated computing machinery comprising an exemplary intermediary computing system 152 configured for automatic rewriting of subtotal calculations according to embodiments of the present invention. The intermediary computing system 152 of FIG. 1 includes at least one computer processor 156 or 'CPU' as well as random access memory 168 (RAM') which is connected through a high speed memory bus 166 and bus adapter 158 to processor 156 and to other components of the intermediary computing system 152.

Stored in RAM 168 is an operating system 154. Operating systems useful in computers configured for automatic rewriting of subtotal calculations according to embodiments of the present invention include UNIX™, Linux™, Microsoft Windows™, AIX™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the table manager 126, a module for automatic rewriting of subtotal calculations according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for automatic rewriting of subtotal calculations according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for automatic rewriting of subtotal calculations according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the table manager 126.

Figure 2:
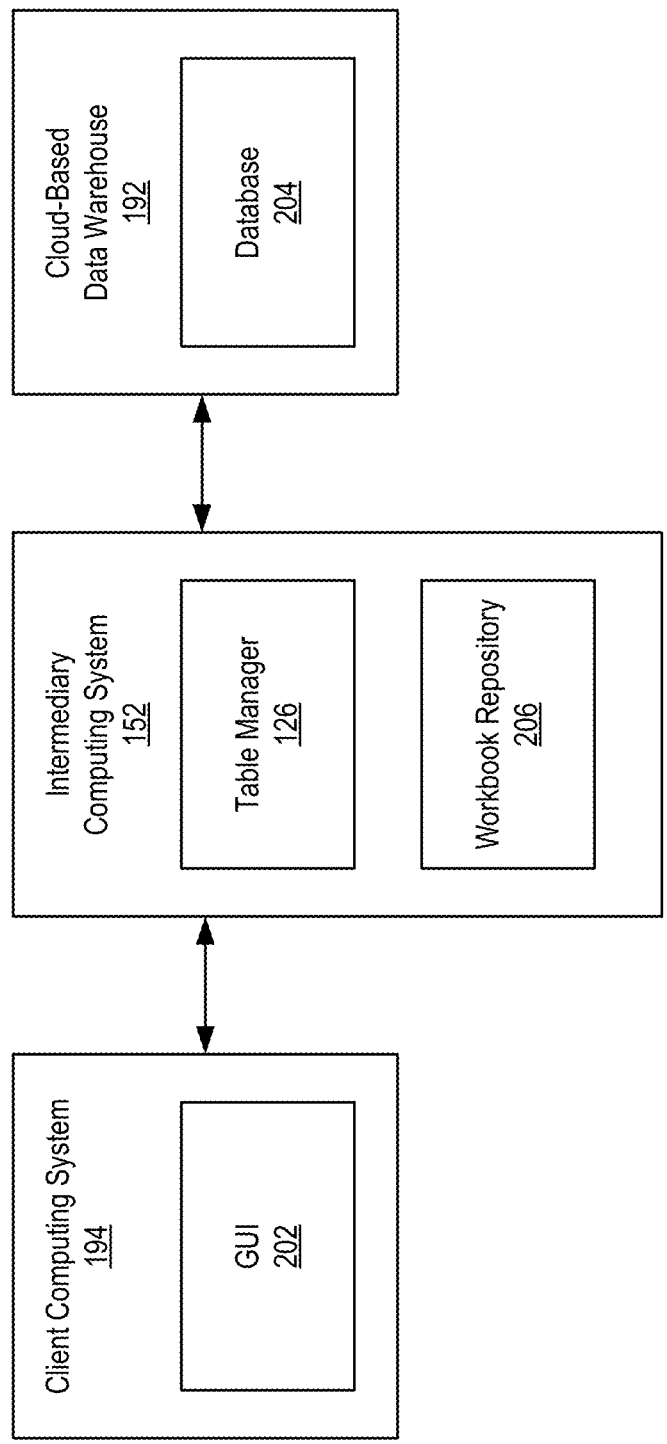
FIG. 2 sets forth a block diagram of an example system configured for automatic rewriting of subtotal calculations according to embodiments of the present invention.

FIG. 2 shows an exemplary system for automatic rewriting of subtotal calculations according to embodiments of the present invention. As shown in FIG. 2, the system includes a client computing system 194, an intermediary computing system 152, and a cloud-based data warehouse 192. The client computing system 194 includes a graphical user interface (GUI) 202. The intermediary computing system 152 includes a table manager 126 and a workbook repository 206. The cloud-based data warehouse 192 includes a database 204. The client computing system 194 may access the cloud-based data warehouse 192 and database 204 via the table manager on the intermediary computing system 152.

The GUI 202 is a visual presentation configured to present data sets in the form of workbooks to a user. The GUI 202 also receives requests from a user for data sets from the database 204. The GUI 202 may also present to the user the ability to add a new row into a data set or table and enter values for each column of the new row. The GUI 202 may be presented, in part, by the table manager 126 and displayed on a client computing system 194 (e.g., on a system display or mobile touchscreen). The GUI 202 may be part of an Internet application that includes the table manager 126 and is hosted on the intermediary computing system 152.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. Data sets may be sent from the cloud-based data warehouse 192 in response to a database statement (also referred to as a query). Accordingly, data sets retrieved in response to a database statement may be referred to as query results.

The table manager 126 is hardware, software, or an aggregation of hardware and software configured to receive instructions in the form of state specifications from the client computing system 194, via the GUI 202. The table manager 126 is also configured to present workbooks in the GUI 202 response to the instructions, which may include generating database statements in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data set. Such elements may include filters applied to the workbook, the hierarchical level of the workbook, joins performed within the workbook, exposable parameters in the workbook, and security for the workbook.

The table manager 126 may use the state specification as input to generate a database statement. This database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

The table manager 126 may use the database statement to fetch query results (i.e., a data set) from the database 204. The table manager 126 may then present the query results to a user via the GUI 202. The table manager 126 may further manage tables on the database 202 to which a user has made edits, such as adding new rows or editing existing rows. Further, the table manager 126 may add columns to new rows and create new tables on the database 202.

The table manager 126 may service requests in the state specification using workbooks local to the table manager 126. A workbook is a presentation of a data set in the GUI 202. Specifically, a workbook is metadata describing a particular organization and configuration of a data set for presentation via the GUI 202. A workbook may include multiple elements including a visualization and a spreadsheet structure. For example, a workbook may include a spreadsheet structure presenting data points from a data set and an accompanying visualization may present a graph of the data points. Such workbooks may be stored in the workbook repository 206.

Figure 3:
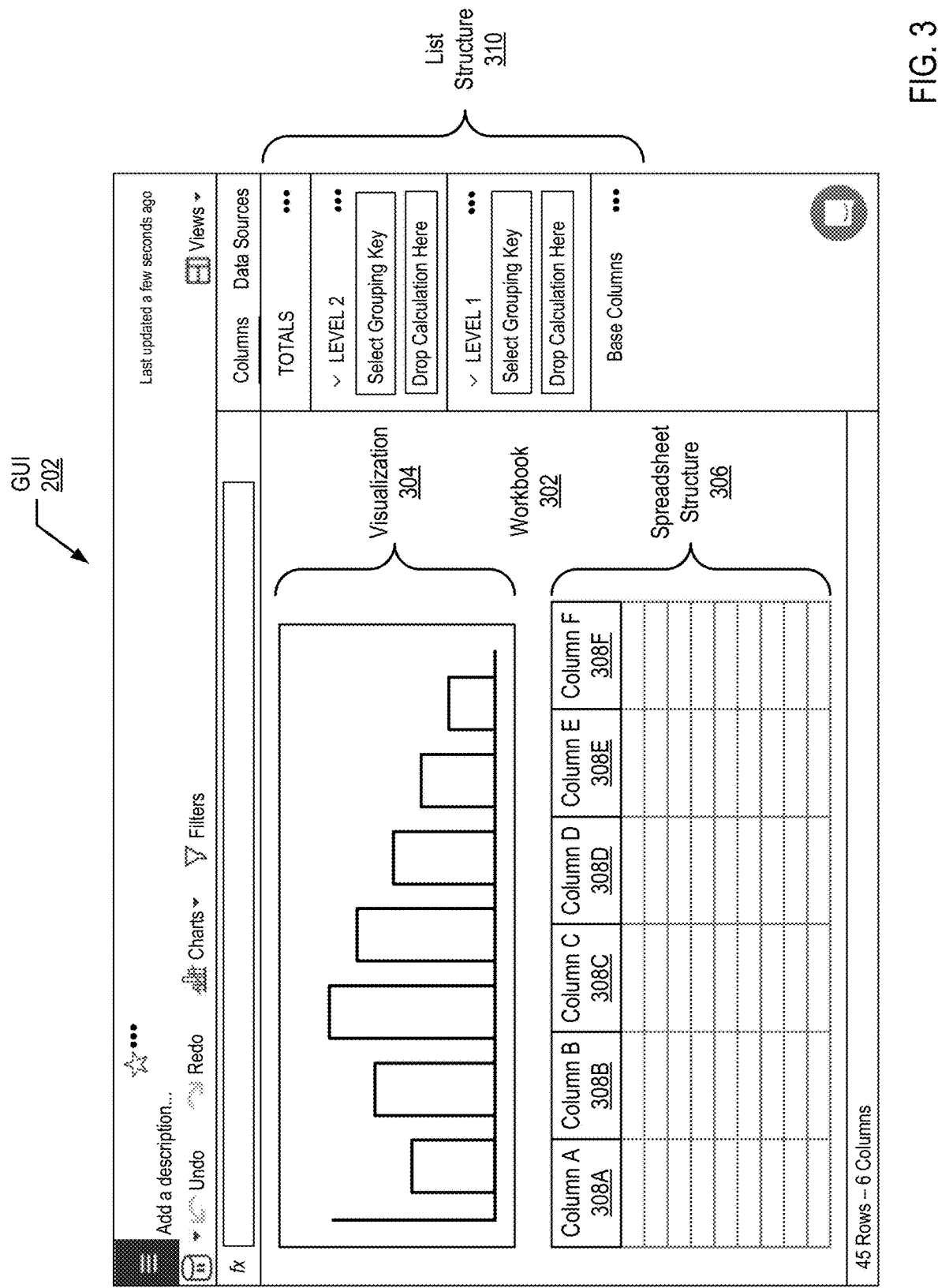
FIG. 3 sets forth a block diagram of an example system configured for automatic rewriting of subtotal calculations according to embodiments of the present invention.

FIG. 3 shows an exemplary system for automatic rewriting of subtotal calculations according to embodiments of the present invention. As shown in FIG. 3, the exemplary GUI 202 includes a workbook 302 and a list structure 310. The workbook 302 includes a visualization 304 and a spreadsheet structure 306 (shown as empty rows) with six columns (column A 308A, column B 308B, column C 308C, column D 308D, column E 308E, column F 308F).

The workbook 302 is a collection of graphical elements and organizing mechanism for a data set. The workbook may present a data set retrieved by the table manager from a cloud-based data warehouse. Specifically, the table manager may generate a database statement in response to the request from a client. The database statement may then be issued to the cloud-based data warehouse and the data set may be received as the query results of the database statement. The data set may then be organized based on the workbook retrieved from the workbook repository. The table manager itself may reside on an intermediary computing system between the client computing system and the cloud-based data warehouse.

As shown in FIG. 3, the workbook 302 includes a visualization 304 and a spreadsheet structure 306. The visualization 304 is a graphical element that conveys relationships between data in the data set. The visualization 304 may include, for example, graphs, charts, or maps. The spreadsheet structure 306 is a presentation of a data set (such as a table) from a database on a data warehouse. The spreadsheet structure 306 displays rows of data organized by columns (column A 308A, column B 308B, column C 308C, column D 308D, column E 308E, column F 308F). The columns delineate different categories of the data in each row. The columns may also be calculation columns that include calculation results using other columns in the spreadsheet structure 306. Both the visualization 304 and the spreadsheet structure 306 may include dynamic elements and be configured to interact with a client via the GUI 202.

The list structure 310 is a graphical element used to define and organize the hierarchical relationships between the columns (column A 308A, column B 308B, column C 308C, column D 308D, column E 308E, column F 308F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 310 presents a dimensional hierarchy to the user. Specifically, the list structure 310 presents levels arranged hierarchically across at least one dimension. Each level within the list structure 310 is a position within a hierarchical relationship between columns (column A 308A, column B 308B, column C 308C, column D 308D, column E 308E, column F 308F). The keys within the list structure 310 identify the one or more columns that are the participants in the hierarchical relationship. Each level may have more than one key.

One of the levels in the list structure 310 may be a base level. Columns selected for the base level provide data at the finest granularity. One of the levels in the list structure 310 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 308A, column B 308B, column C 308C, column D 308D, column E 308E, column F 308F) into the list structure 310. The order of the list structure 310 may specify the hierarchy of the columns relative to one another. A user may be able to drag and drop the columns in the list structure 310 at any time to redefine the hierarchical relationship between columns. The hierarchical relationship defined using the columns selected as keys in the list structure 310 may be utilized in charts such that drilling down (e.g., double click on a bar), enables a new chart to be generated based on a level lower in the hierarchy.

The GUI 202 may also include a mechanism for a user to request a table from a database to be presented as a workbook in the GUI 202. Such a mechanism may be part of the interactivity of the workbook. Specifically, a user may manipulate a workbook (e.g., by dragging and dropping columns or rows, resorting columns or rows, manipulating a graph etc.) and, in response, the GUI 202 may generate a request (e.g., in the form of a state specification) for a data set and send the request to the table manager 126. Such a mechanism may also include a direct identification of the rows and columns of a database table that a user would like to access (e.g., via a selection of the rows and columns in a dialog box). The GUI 202 may also include a mechanism for a user to create a new table on the database, add rows to a table, and move rows within the table.

Figure 4:
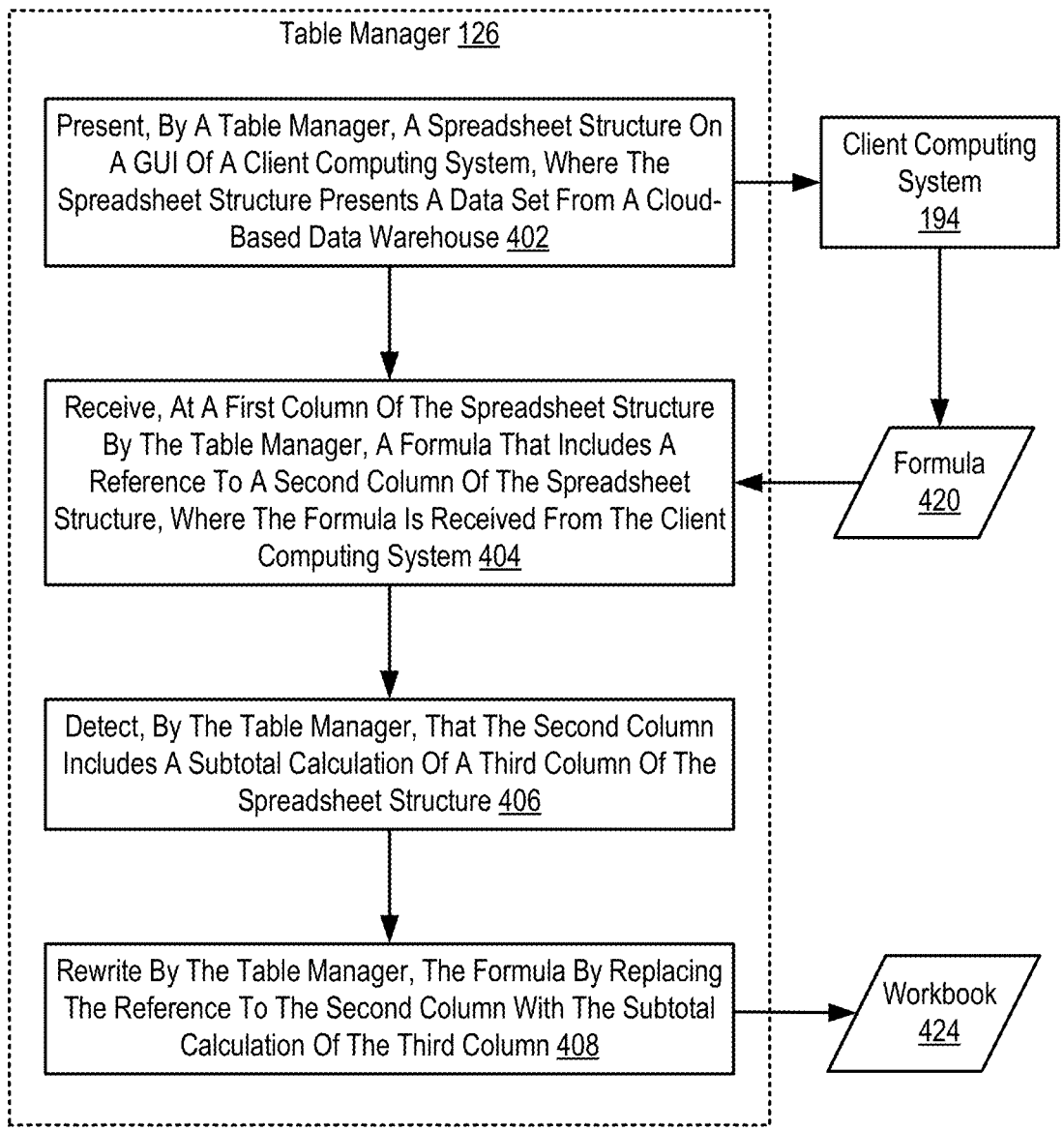
FIG. 4 sets forth a flow chart illustrating an exemplary method for automatic rewriting of subtotal calculations according to embodiments of the present invention.

For further explanation, FIG. 4 sets forth a flow chart illustrating an exemplary method for automatic rewriting of subtotal calculations according to embodiments of the present invention that includes presenting 402, by a table manager 126, a spreadsheet structure on a GUI of a client computing system 194, wherein the spreadsheet structure presents a data set from a cloud-based data warehouse. Presenting 402 the spreadsheet structure on the GUI of the client computing system 194 may be carried out by organizing the data set from the cloud-based data warehouse into the spreadsheet structure according to the workbook. The workbook may be a preexisting workbook created by a client using the client computing system 194 or may be a default workbook used after the data set is selected by the client. The workbook may include columns (such as calculation columns) in addition to the columns that exist in the data set.

The method of FIG. 4 also includes receiving 404, at a first column of the spreadsheet structure by the table manager 126, a formula 420 that includes a reference to a second column of the spreadsheet structure, wherein the formula 420 is received from the client computing system 194. Receiving 404 the formula 420 at the first column of the spreadsheet structure may be carried out by detecting that the client on the client computing system 194 has manipulated elements of the GUI and/or submitted data using the GUI such that the generation of an instruction including the formula 420 is triggered, and the formula 420 is sent to the table manager 126. The formula 420 may be received in the form of a state specification from the GUI.

The formula 420 may be received within a request to create the first column. Specifically, the client may generate a request to create a new (first) column that includes the formula 420. The request may be generated in response to the client selecting a location for the new column and activating an option to create a new column at the selected location. The client may then be prompted to enter the formula with the option to include references to other columns, rows, and/or individual cells.

The formula 420 in the first column may calculate a value at a different granularity than the value calculated for the second column. Specifically, the formula in the first column may be configured to calculate a result at a level of detail (e.g., per month) different than the result calculated for the second column (e.g., per week). The level of granularity may change depending on a selection by the client. For example, a change to the level order in the list structure may alter the level of detail displayed for the associated columns.

The method of FIG. 4 also includes detecting 406, by the table manager 126, that the second column includes a subtotal calculation of a third column of the spreadsheet structure. Detecting 406 that the second column includes a subtotal calculation of the third column of the spreadsheet structure may be carried out by evaluating the received formula for the reference to any column comprising a subtotal calculation. If the received formula 420 includes a reference to another column that includes a subtotal calculation, then the detection is triggered.

A subtotal calculation is an aggregate summary of values. The summary of values may be for a particular level of granularity selected by the client or other editor of the workbook. The second column may be an aggregate summary of values from the third column (which itself may include values or a calculation). For example, the subtotal calculation may be calculating an average value (e.g., average stock price) of the third column (e.g., stock price value every hour) on a day, week, or month basis (e.g., average daily, weekly, or monthly stock price). Note that the third column would not also include a subtotal calculation of a forth column because the formula for the second column would have been rewritten by the table manger 126 using the process described herein.

The subtotal calculation may be an arbitrary expression received from the client computing system. Specifically, the client may not be limited as to the type of subtotal calculation. For example, the client may not be limited to sum, count, average, maximum, minimum, product, standard deviation, or variance. The subtotal calculation may be unrestrained and include any element or formula, including those used by other columns in the workbook. For example, the third column may be a temperature measurement at different cities (one per row) and the subtotal calculation of the second column may be an average temperature, converted from Fahrenheit to Celsius, for different regions (i.e., multiple cities).

The subtotal calculation of the second column may use some or all of the rows in the third column as input. Further, the subtotal calculation may be divided based on the level of granularity presented, and each subtotal calculation may use a portion of the existing rows in the third column as input. For example, as above, the third column may be a temperature measurement at different cities (one per row) and the subtotal calculation of the second column may be an average temperature for different regions (i.e., multiple cities). This may be displayed in the spreadsheet interface using a single cell in the second column that spans multiple rows of the third column (i.e., the rows that make up the region).

Additionally, the subtotal calculation of the second column may change depending on a level of granularity selected for the second column. Specifically, the client may be able to adjust the scope of each subtotal calculation of the second column (e.g., by a change to the list structure to alter the level of detail displayed for the associated columns). However, altering the level of granularity may affect the results presented in calculation columns that use the second column as input. For example, changing the second column from the average for a week to an average for a month may cause a sum calculation for the first column be inaccurately evaluated (unless the first column formula is rewritten).

The method of FIG. 4 also includes rewriting 408, by the table manager 126, the formula 420 by replacing the reference to the second column with the subtotal calculation of the third column. Rewriting 408 the formula 420 by replacing the reference to the second column with the subtotal calculation of the third column may be carried out in response to the detection that the second column includes the subtotal calculation of the third column of the spreadsheet structure. The formula 420 may be rewritten such that the reference to the second column is replaced by the same calculation used in the second column to determine the presented values. Rewriting the formula 420 may also include reconfiguring the formula once the subtotal calculation is incorporated (e.g., by rearranging or combining operations and elements).

Consider the following example of the method described above. A data set tracking sales may include one column for date, one for price, and one for cost. The workbook may add a column (column A) that calculates a subtotal for the average price for a given period of time and another column (column B) that calculates a subtotal for the average cost for a given period of time. The client may then add a new column (column C) to calculate the difference between the average cost subtotal and the average price subtotal. Having received the formula for the new column (i.e., column C, the first column), the table manager detects that the formula includes two references to columns (i.e., column A and column B, second columns) that include subtotal calculations. The table manager then rewrites the formula for column C from "column B-column A" to the subtotal for the average cost for a given period of time minus the subtotal for the average price for the given period of time.

The above limitations improve the operation of the computer system by correcting formulas to account for references to arbitrary subtotal calculations. This is performed by detecting the addition of a formula that references a subtotal calculation and rewriting that formula to remove the references to the subtotal calculation while maintaining the accuracy of the received formula.

Figure 5:
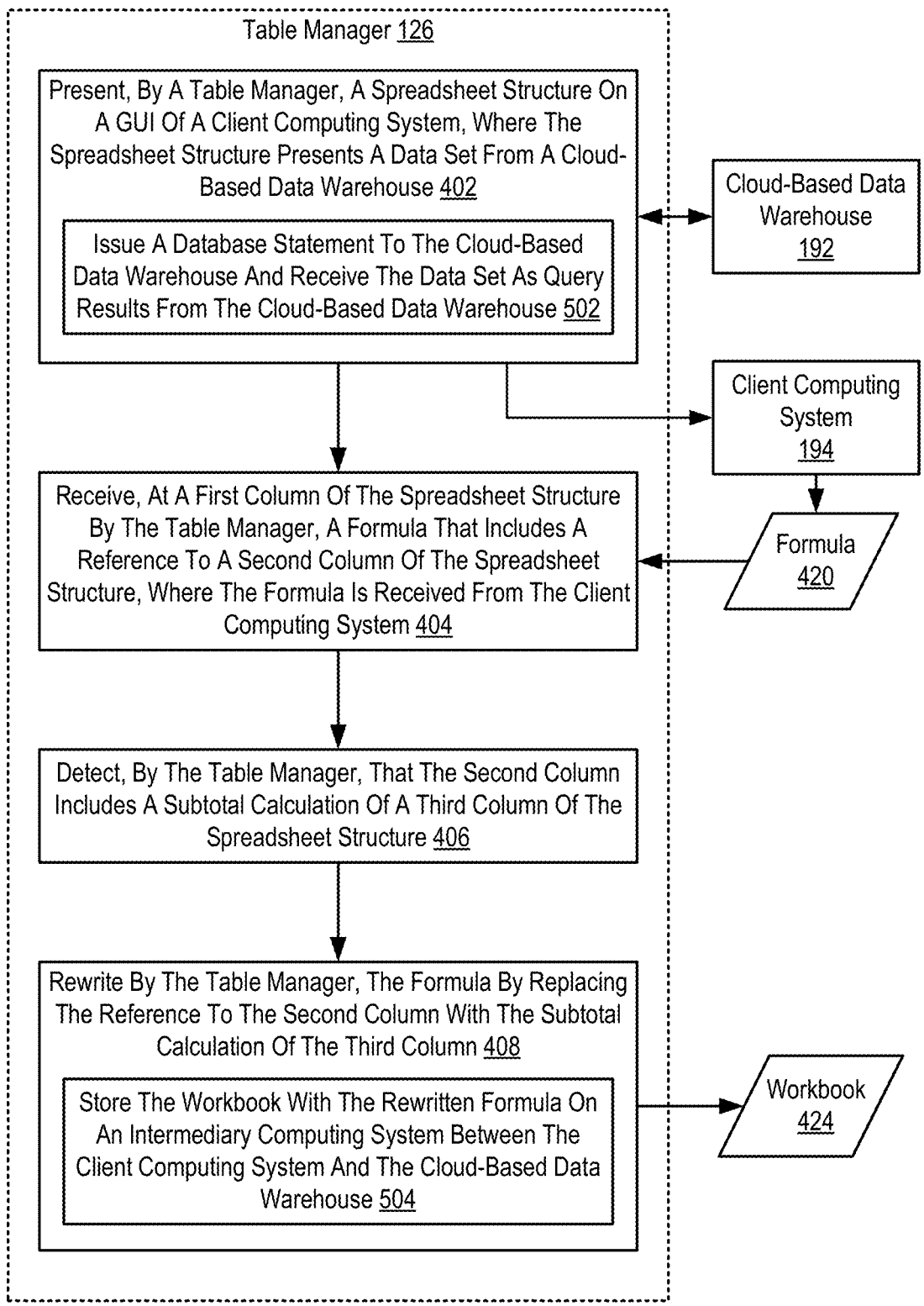
FIG. 5 sets forth a flow chart illustrating an exemplary method for automatic rewriting of subtotal calculations according to embodiments of the present invention.

For further explanation, FIG. 5 sets forth a flow chart illustrating a further exemplary method for automatic rewriting of subtotal calculations according to embodiments of the present invention that includes presenting 402, by a table manager 126, a spreadsheet structure on a GUI of a client computing system 194, wherein the spreadsheet structure presents a data set from a cloud-based data warehouse; receiving 404, at a first column of the spreadsheet structure by the table manager 126, a formula 420 that includes a reference to a second column of the spreadsheet structure, wherein the formula 420 is received from the client computing system 194; detecting 406, by the table manager 126, that the second column includes a subtotal calculation of a third column of the spreadsheet structure; and rewriting 408, by the table manager 126, the formula 420 by replacing the reference to the second column with the subtotal calculation of the third column.

The method of FIG. 5 differs from the method of FIG. 4, however, in that presenting 402, by a table manager 126, a spreadsheet structure on a GUI of a client computing system 194, wherein the spreadsheet structure presents a data set from a cloud-based data warehouse includes issuing 502 a database statement to the cloud-based data warehouse 192 and receiving the data set as query results from the cloud-based data warehouse 192. Issuing 502 the database statement to the cloud-based data warehouse 192 and receiving the data set as query results from the cloud-based data warehouse 192 may be carried out by compiling a database statement to retrieve the dataset from the cloud-based data warehouse 192. Once the query results including the data set are received, the table manager 126 then organizes the data set into the spreadsheet structure within the worksheet.

The method of FIG. 5 also differs from the method of FIG. 4 in that rewriting 408 the formula 420 by replacing the reference to the second column with the subtotal calculation of the third column includes storing 506 the workbook 424 with the rewritten formula 420 on an intermediary computing system between the client computing system 194 and the cloud-based data warehouse 192. The spreadsheet structure may be within a workbook and storing 506 the workbook 424 with the rewritten formula 420 on an intermediary computing system between the client computing system 194 and the cloud-based data warehouse 192 may be carried out by saving the workbook 424 in the workbook repository on the same intermediary computing system as the table manager 126.

In view of the explanations set forth above, readers will recognize that the benefits of automatic rewriting of subtotal calculations according to embodiments of the present invention include:

Improving the operation of the computer system by correcting formulas to account for references to arbitrary subtotal calculations, increasing system robustness.

Improving the operation of the computer system by detecting the addition of a formula that references a subtotal calculation and rewriting that formula to remove the references to the subtotal calculation while maintaining the accuracy of the received formula, increasing system utility.

Exemplary embodiments of the present invention are described largely in the context of a fully functional computer system for automatic rewriting of subtotal calculations. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for automatic rewriting of subtotal calculations, the method comprising:
   presenting, by a table manager, a spreadsheet structure on a GUI of a client computing system, wherein the spreadsheet structure presents a data set from a cloud-based data warehouse;
   receiving, at a first column of the spreadsheet structure by the table manager, a formula that includes a reference to a second column of the spreadsheet structure, wherein the formula is received from the client computing system, wherein receiving the formula that includes the reference to the second column of the spreadsheet structure comprises receiving a request to create the first column;
   detecting, by the table manager, that the second column includes a subtotal calculation of a third column of the spreadsheet structure; and
   rewriting, by the table manager, the formula by replacing the reference to the second column with the subtotal calculation of the third column.

2. The method of claim 1, wherein the subtotal calculation is an arbitrary expression received from the client computing system.

3. The method of claim 1, wherein the formula in the first column calculates a value at a different granularity than a value calculated for the second column.

4. The method of claim 1, wherein the subtotal calculation of the second column changes depending on a level of granularity selected for the second column.

5. The method of claim 1, wherein each subtotal calculation of the second column uses a portion of existing rows in the third column as input.

6. The method of claim 1, wherein presenting the spreadsheet structure on the GUI of the client computing system comprises issuing a database statement to the cloud-based data warehouse and receiving the data set as query results from the cloud-based data warehouse.

7. The method of claim 1, wherein detecting that the second column includes a subtotal calculation of the third column comprises evaluating the received formula for the reference to any column comprising a subtotal calculation.

8. The method of claim 1, wherein the spreadsheet structure is within a workbook, and wherein rewriting the formula comprises storing the workbook with the rewritten formula on an intermediary computing system between the client computing system and the cloud-based data warehouse.

9. The method of claim 1, wherein the table manager is on an intermediary computing system between the client computing system and the cloud-based data warehouse.

10. The method of claim 1, wherein the spreadsheet structure is within a workbook, and wherein rewriting the formula comprises storing the workbook with the rewritten formula on an intermediary computing system between the client computing system and the cloud-based data warehouse.

11. An apparatus for automatic rewriting of subtotal calculations, the apparatus comprising a computer processor, a computer memory operatively coupled to the computer processor, the computer memory having disposed within it computer program instructions that, when executed by the computer processor, cause the apparatus to carry out the steps of:
   presenting a spreadsheet structure on a GUI of a client computing system, wherein the spreadsheet structure presents a data set from a cloud-based data warehouse;
   receiving, at a first column of the spreadsheet structure, a formula that includes a reference to a second column of the spreadsheet structure, wherein the formula is received from the client computing system, wherein receiving the formula that includes the reference to the second column of the spreadsheet structure comprises receiving a request to create the first column;
   detecting that the second column includes a subtotal calculation of a third column of the spreadsheet structure; and
   rewriting the formula by replacing the reference to the second column with the subtotal calculation of the third column.

12. The apparatus of claim 11, wherein the subtotal calculation is an arbitrary expression received from the client computing system.

13. The apparatus of claim 11, wherein the formula in the first column calculates a value at a different granularity than a value calculated for the second column.

14. The apparatus of claim 11, wherein the subtotal calculation of the second column changes depending on a level of granularity selected for the second column.

15. The apparatus of claim 11, wherein each subtotal calculation of the second column uses a portion of existing rows in the third column as input.

16. The apparatus of claim 11, wherein presenting the spreadsheet structure on the GUI of the client computing system comprises issuing a database statement to the cloud-based data warehouse and receiving the data set as query results from the cloud-based data warehouse.

17. The apparatus of claim 11, wherein detecting that the second column includes a subtotal calculation of the third column comprises evaluating the received formula for the reference to any column comprising a subtotal calculation.

18. A computer program product for automatic rewriting of subtotal calculations, the computer program product disposed upon a computer readable medium, the computer program product comprising computer program instructions that, when executed, cause a computer to carry out the steps of:

presenting a spreadsheet structure on a GUI of a client computing system, wherein the spreadsheet structure presents a data set from a cloud-based data warehouse;

receiving, at a first column of the spreadsheet structure, a formula that includes a reference to a second column of the spreadsheet structure, wherein the formula is received from the client computing system, wherein receiving the formula that includes the reference to the second column of the spreadsheet structure comprises receiving a request to create the first column;

detecting that the second column includes a subtotal calculation of a third column of the spreadsheet structure; and rewriting the formula by replacing the reference to the second column with the subtotal calculation of the third column.

\* \* \* \* \*